United States Patent Office 3,126,357
Patented Mar. 24, 1964

3,126,357
HIGH TEMPERATURE CEMENT INCLUDING THERMOSETTING SILICONE RESIN AND CRISTOBALITE SILICA
Edward O. Liebig, Chatham, N.J., assignor, by mesne assignments, to Engelhard Industries, Inc., Newark, N.J., a corporation of Delaware
No Drawing. Filed Jan. 2, 1959, Ser. No. 784,426
7 Claims. (Cl. 260—37)

This invention relates to a cement adapted primarily for use at high temperatures.

This application is a continuation-in-part of application Serial No. 633,382, filed January 10, 1957, now abandoned.

There has long been a need for a high temperature cement which will neither crack nor craze at high temperatures, and one which will also bend and not crack. The cement of this invention possesses all of these desirable properties. One application of the cement of this invention is in the bonding or cementing of transducers to the shell or skin of rockets, missiles and the like. As missiles, rockets and the like travel through the atmosphere, the exterior skin thereof becomes heated to high temperatures as a result of air friction, and it is desirable to measure these temperatures by means of transducers. Transducers cannot be attached to the metal shells of such objects by rivets or the like, but must be cemented thereto. The cement of the present invention is admirably suited to this purpose, as it is unaffected by the high temperatures to which it is subjected while the missile, or the like, is in flight and it will also remain intact when subjected to physical shocks, since the cement always retains a degree of elasticity or flexibility.

Another application of the cement of the present invention is as a buffer, since the cement may be applied to a metal and then a sprayed ceramic can be overlaid on the cement as a covering. The cement is flexible and does not crack due to thermal expansion and contraction of the metal, hence the sprayed ceramic covering is similarly unaffected. Also, since the cement acts as a buffer, the sprayed ceramic covering resists physical shocks to a much greater degree than if the cement were eliminated.

In its preferred form the cement in accordance with the present invention comprises cristobalite silica and mica in admixture with a liquid thermosetting silicone resin. The cristobalite silica and mica may each be present in the range of 10 to 65 percent by weight, preferably 15 to 50 percent by weight of the cement formulation, and the liquid thermosetting silicone resin may comprise 25 to 80 percent, preferably 35 to 70 percent.

In the present case the use of cristobalite silica in the cement is considered to be an important factor in the success of the cement particularly as employed in high temperature applications. In this regard, it is noted that cristobalite silica is a special form of quartz which is produced at temperatures above 1470° C. This vitreous form of silica has several unusual properties which make it particularly effective as a component of cement.

One of these important factors is the denser packing which is possible with cristobalite as compared to the possible constituents for cement. This is attributable in part to the crystal structure of cristobalite which is cubic or tetragonal as contrasted to the hexagonal crystal structure of normal silica at room temperature. With this close packing of the crystals, there is less tendency for shifting or other forms of cement failure which could occur with a crystal structure or an amorphous filler in which the filler particles could readily slide with respect to one another.

Temperature stability is another property of cristobalite which is particularly important in the filler materials for high temperature cements. In this regard, it is noted that the heating of silica from room temperature up to the 1470° C. temperature at which cristobalite is formed normally involves three to seven changes in the structure of the quartz depending on other conditions. Changes in form of this type when heating occurs will naturally tend toward failure of the cement. More specifically, when the filler changes its crystalline structure or starts to melt at elevated temperatures, the bond between the silicone resin and the filler is impaired, and the cement may fail. This does not occur to any substantial extent with the stable cristobalite form of silica.

The mica used in the cement may have a particle size in the range of mica flake to 500 mesh and is generally used in the range of about 30 to 300 mesh. The mica in flake form apparently prevents fine cracks from forming in the cement when it is subjected to thermal shocks.

Additional inert fillers may also be added to the cement and these fillers may be refractory oxides, or high or low silicates, and among such fillers are compounds such as silica, or forms of silica such as thoria, beryllia, zirconia, zircon, alumina, magnesia, mullite, magnorite, asbestos, and mixtures of refractory oxides. When a refractory oxide is included in the filler, it is preferably a calcined oxide. The inert filler is also finely divided and may have a particle size in the range of 30 to 600 mesh, preferably 100 to 300 mesh. If desired, various pigments or other coloring agents may be added to the cements to impart desired colors to the final cement formulation.

In the formation of the cements of the present invention, selected filler materials as discussed above are mixed with a liquid thermosetting silicone resin and the mixture is then applied to the object desired to be cemented, such as a transducer for example. The cement is then cured by drying for a period of 6 to 24 hours at a temperature in the range of 65 to 120° F., and this drying step is followed by a heat treatment in the range of 300 to 480° F. for a period of 1 to 4 hours, after which the cemented object is ready for use.

The thermosetting silicone resins which may be used in the cement formulations of the invention are those of the polysiloxane type which can be cross-linked. They can be thinned with solvents, such as benzene, toluene, xylene, chloroform, methyl ethyl ketone, ethyl ether, carbon tetrachloride, amyl acetate, and the like. In each case, the amount of solvent which is employed will depend on the intended mode of application of the cement and the desired viscosity.

In this disclosure, by the term silicone resin any of the numerous organo siloxane polymers or mixtures thereof, known also as organo silicone oxide polymers, will be understood. Their structural composition comprises giant molecules of silicone atoms connected to each other by oxygen atoms through silicon-oxygen linkages, thus forming chains of linear polymers which may be cross-linked to each other generally by further oxygen bridges. The chain molecules have the structural formula

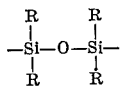

wherein R stands for substituted and unsubstituted alkyl, aryl or alkoxyl radicals; and the numerous different varieties of resins available on the market are obtained by the great amount of possible substitution, cross-linkage and mixtures of the products. As noted on page 112 of a book entitled "Silicones and Other Organic Silicon Compounds," by Howard W. Post, Reinhold Publishing Corporation, New York, 1949, suitable compounds included in the cement after it is set include phenyl ethyl polysiloxane, dodecyltrichlorosilane, dimethyl polysiloxane, octadecyltrichlorosilane and "lauryl polysiloxane." Other compounds which may be employed are also disclosed elsewhere in this cited text.

The invention will be further illustrated by reference to the following specific examples showing various cement formulations possessing desired high temperature characteristics. In each example the thermosetting silicone resin used was of the polysiloxane type in a xylene solvent with a resin solid content of about 50 percent and having a specific gravity at 25° C. of 1.01. Each of the cement formulations was cured by drying for 12 hours at room temperature, followed by a heat treatment at a temperature of 300° F. for a period of 2 hours.

*Example I*

0.5 part by weight of mica having a particle size of 100 mesh was intimately mixed with 0.5 part by weight of cristobalite silica having a particle size of 320 mesh. 70 grams of the mica-silica mixture were then added to 100 ml. of liquid thermosetting silicone resin as specified above, and the cement was cured as described above.

*Example II*

One part by weight of mica having a particle size of 100 mesh was mixed with one part by weight of cristobalite silica having a particle size of 320 mesh and one part by weight of anhydrous zirconia having a particle size of 400 mesh. This mixture was white in color. 95 grams of the mica-silica-zirconia mixture were added to and mixed with 100 ml. of liquid thermosetting silicone resin, and the cement was cured in the manner described above.

*Example III*

One part by weight of mica having a particle size of 100 mesh was mixed with one part by weight of cristobalite silica having a particle size of 320 mesh and one part by weight of anhydrous beryllia having a particle size of 400 mesh. A yellow color was imparted to the mixture by the admixture of 0.1 percent by weight of iron oxide. 90 grams of the colored mica-silica-beryllia mixture were added to and mixed with 100 ml. liquid thermosetting silicone resin as specified above, and the cement was cured in the manner described above.

*Example IV*

One part by weight of mica having a particle size of 100 mesh was mixed with one part by weight of cristobalite silica having a particle size of 320 mesh and one part by weight of anhydrous alumina having a particle size of 400 mesh. This mixture was colored green by the admixture of 0.1 percent by weight of chromic oxide. 100 grams of the colored mica-silica-alumina mixture were mixed with 100 ml. of liquid thermosetting silicone resin as specified above, and the cement was cured in the manner described above.

*Example V*

One part by weight of mica having a particle size of 100 mesh was mixed with one part by weight of cristobalite silica having a particle size of 320 mesh and one part by weight of zircon having a particle size of 400 mesh. This mixture was colored red by the addition of 0.1 percent by weight of venetian red. 95 grams of the colored mica-silica-zircon were added to 100 ml. of liquid thermosetting silicone resin as described above, and the cement was cured in the manner described above.

Since the cements of the present invention generally contain calcined oxides, the consistency thereof may be somewhat granular, and this can be remedied by proper grinding and mixing of the refractory filler in a ball mill or similar comminuting equipment.

The content of the cements described in the foregoing examples may be analyzed on a "liquids" basis. This refers to the percentages of materials included in the cement prior to application. It is understood, of course, that the filler materials are present in the mixture in finely divided solid form. In each of the specific Examples I through V the same amount of mica and cristobalite silicone are included. The amount of each of these components as a portion by weight of the liquid cement ranges from about 15 percent to 21 percent in the various specific examples. In addition, the total amount of liquid silicone resin in each of the exemplary cements ranges from about 50 percent to 60 percent.

As mentioned above the resin solid content of the liquid silicone resin is about 50 percent. When it is desired to use the cement in a thick or paste form, therefore, the proportion of "liquid" silicone resin would be somewhat reduced from the percentages set forth above, and that of the other constituents would be increased.

On a general basis it may also be noted that the total amount of mica, cristobalite silica, and other filler materials generally makes up about 50 percent or slightly less of the liquid cement, in the foregoing examples. Reasonable variations in the proportions of the component fillers included in the cement are, of course, within the scope of the present invention, and will provide a cement having optimum properties for different conditions of use. In this regard it is considered that many of the advantages of the present invention may be obtained for applications where tolerances must be maintained under compression by the use of a filler consisting only of cristobalite silica, or of cristobalite silica in combination with additional fillers other than mica.

It is to be understood that the above described arrangements are illustrative of the application of the principles of the invention. Numerous other arrangements may be devised by those skilled in the art without departing from the spirit and scope of the invention.

What is claimed is:

1. A cement comprising a mixture of a thermosetting silicone resin, mica and cristobalite silica, the cristobalite silica being present in amount of at least 10 weight percent of the total weight of the cement.

2. A cement comprising a mixture of 10 to 65 percent by weight of mica, 10 to 65 percent by weight of cristobalite silica, and 25 to 80 percent by weight of a thermosetting silicone resin.

3. A cement comprising a mixture of 25 to 75 percent by weight of a thermosetting silicone resin and 25 to 75 percent by weight of a filler selected from the group consisting of mica, cristobalite silica and mixtures thereof, said filler including at least 10 percent of mica and 10 percent of cristobalite silica.

4. A cement comprising a mixture of 15 to 50 percent by weight of mica, 15 to 50 percent by weight of cristobalite silica, and 35 to 70 percent by weight of a thermosetting silicone resin.

5. A cement comprising a mixture of 25 to 75 percent by weight of a thermosetting silicone resin and 25 to 75 percent by weight of refractory oxide filler material, the cement including at least 10 percent of cristobalite silica forming at least part of the refractory oxide filler material.

6. A cement consisting essentially of a mixture of a thermosetting silicone resin, mica, and refractory oxides, the cement including at least 10 percent of cristobalite silica.

7. A liquid cement comprising a mixture of 10 to 65 percent of cristobalite silica and 25 to 80 percent by weight of a thermosetting silicone resin.

References Cited in the file of this patent

UNITED STATES PATENTS

| | | |
|---|---|---|
| 2,843,559 | Kornbluth | July 15, 1958 |
| 2,984,590 | Anderson | May 16, 1961 |

FOREIGN PATENTS

| | | |
|---|---|---|
| 722,593 | Great Britain | Jan. 26, 1955 |
| 688,185 | Great Britain | Feb. 25, 1953 |

OTHER REFERENCES

Sosman: Properties of Silica, Monograph Series, No. 37, Chemical Catalog Co., 1927, page 45.